(12) United States Patent
Nakagawa et al.

(10) Patent No.: US 11,511,185 B2
(45) Date of Patent: Nov. 29, 2022

(54) OPERATION DEVICE

(71) Applicant: Sony Interactive Entertainment Inc., Tokyo (JP)

(72) Inventors: Yusuke Nakagawa, Kangawa (JP); Ikuo Yamano, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 122 days.

(21) Appl. No.: 16/756,749

(22) PCT Filed: Oct. 27, 2017

(86) PCT No.: PCT/JP2017/038937
§ 371 (c)(1),
(2) Date: Apr. 16, 2020

(87) PCT Pub. No.: WO2019/082386
PCT Pub. Date: May 2, 2019

(65) Prior Publication Data
US 2020/0406128 A1     Dec. 31, 2020

(51) Int. Cl.
*G05G 9/047*     (2006.01)
*A63F 13/23*     (2014.01)
(Continued)

(52) U.S. Cl.
CPC ............ *A63F 13/23* (2014.09); *A44B 11/065* (2013.01); *A63F 13/24* (2014.09); *A63F 13/285* (2014.09);
(Continued)

(58) Field of Classification Search
CPC .................................................... A44B 11/065
See application file for complete search history.

(56) References Cited

U.S. PATENT DOCUMENTS 5,555,894 A    9/1996  Doyama
5,734,373 A    3/1998  Rosenberg
(Continued)

FOREIGN PATENT DOCUMENTS

CN    101610877 A    12/2009
CN    104043246 A    9/2014
(Continued)

OTHER PUBLICATIONS

The First Office Action for related CN Application No. 201780044599. 0, 20 pages, dated Jun. 4, 2021.
(Continued)

*Primary Examiner* — Vicky A Johnson
(74) *Attorney, Agent, or Firm* — Matthew B. Dernier, Esq.

(57) ABSTRACT

An operation device includes a movable member that is movable within a predetermined range, and a restriction member that is disposed in a state of being movable in a movable direction of the movable member, that restricts the movable range of the movable member by coming into contact with a contact surface of the movable member in the movable direction, and that can be switched between a state of being in contact with a first range of the contact surface and restricting the movable range of the movable member and a state of being in contact with a second range, the second range being different from the first range, of the contact surface and restricting the movable range of the movable member.

5 Claims, 6 Drawing Sheets

(51) Int. Cl.
| | |
|---|---|
| *A63F 13/24* | (2014.01) |
| *A63F 13/285* | (2014.01) |
| *F16M 13/00* | (2006.01) |
| *F16M 13/04* | (2006.01) |
| *A44B 11/06* | (2006.01) |
| *G05G 5/03* | (2008.04) |

(52) U.S. Cl.
CPC .......... *F16M 13/00* (2013.01); *F16M 13/005* (2013.01); *F16M 13/04* (2013.01); *G05G 5/03* (2013.01); *G05G 9/047* (2013.01); *A63F 2300/1037* (2013.01); *A63F 2300/8082* (2013.01)

(56) References Cited

U.S. PATENT DOCUMENTS

| | | |
|---|---|---|
| 5,982,354 A | 11/1999 | Arita |
| 5,999,168 A | 12/1999 | Rosenberg |
| 6,380,925 B1 | 4/2002 | Martin |
| 6,468,158 B1* | 10/2002 | Ootori ............... G05G 9/04785 463/37 |
| 7,196,688 B2 | 3/2007 | Schena |
| 7,407,439 B1 | 8/2008 | Ochoa |
| 7,890,863 B2 | 2/2011 | Grant |
| 8,059,089 B2 | 11/2011 | Daniel |
| 8,491,388 B2 | 7/2013 | Miyazaki |
| 8,686,961 B2 | 4/2014 | Yamano |
| 9,164,587 B2 | 10/2015 | Da Costa |
| 9,174,134 B1 | 11/2015 | Grant |
| 9,174,344 B2 | 11/2015 | Nahavandi |
| 9,490,088 B2 | 11/2016 | Sawada |
| 9,557,830 B2 | 1/2017 | Grant |
| 9,606,569 B2 | 3/2017 | Ueda |
| 9,778,743 B2 | 10/2017 | Grant |
| 9,785,237 B2 | 10/2017 | Shinozaki |
| 9,921,649 B2 | 3/2018 | Grant |
| 10,124,252 B2 | 11/2018 | Grant |
| 10,133,354 B2 | 11/2018 | Grant |
| 10,159,896 B2 | 12/2018 | Strahle |
| 10,185,396 B2 | 1/2019 | Rihn |
| 10,216,278 B2 | 2/2019 | Nakamura |
| 10,226,693 B2 | 3/2019 | Strahle |
| 10,300,778 B2 | 5/2019 | Nomizo |
| 10,353,471 B2 | 7/2019 | Da Costa |
| 10,509,472 B2 | 12/2019 | Grant |
| 10,534,432 B2 | 1/2020 | Okumura |
| 10,632,367 B2 | 4/2020 | Strahle |
| 2001/0002126 A1 | 5/2001 | Rosenberg |
| 2001/0008849 A1 | 7/2001 | Komata |
| 2001/0011995 A1 | 8/2001 | Hinckley |
| 2001/0030658 A1 | 10/2001 | Rosenberg |
| 2002/0054060 A1 | 5/2002 | Schena |
| 2002/0075233 A1 | 6/2002 | White |
| 2002/0190528 A1 | 12/2002 | Ootori |
| 2004/0113932 A1 | 6/2004 | Rosenberg |
| 2005/0156892 A1 | 7/2005 | Grant |
| 2006/0028095 A1 | 2/2006 | Maruyama |
| 2009/0106655 A1 | 4/2009 | Grant |
| 2009/0131171 A1 | 5/2009 | Miyazaki |
| 2010/0092267 A1 | 4/2010 | Najdovski |
| 2011/0134034 A1 | 6/2011 | Daniel |
| 2012/0026110 A1 | 2/2012 | Yamano |
| 2012/0038468 A1 | 2/2012 | Provancher |
| 2012/0105367 A1 | 5/2012 | Son |
| 2012/0154134 A1 | 6/2012 | Lim |
| 2013/0147610 A1 | 6/2013 | Grant |
| 2013/0265149 A1 | 10/2013 | Nakamura |
| 2013/0267321 A1 | 10/2013 | Burgess |
| 2013/0321273 A1 | 12/2013 | O'Keefe |
| 2014/0094310 A1 | 4/2014 | Bleich |
| 2014/0139451 A1 | 5/2014 | Levesque |
| 2014/0274398 A1* | 9/2014 | Grant ............... G06F 3/016 463/37 |
| 2014/0305783 A1 | 10/2014 | Sawada |
| 2014/0315642 A1 | 11/2014 | Grant |
| 2015/0002416 A1 | 1/2015 | Koike |
| 2015/0035658 A1* | 2/2015 | Provancher ............ G05G 9/047 340/407.1 |
| 2015/0042461 A1 | 2/2015 | Shinozaki |
| 2015/0097800 A1 | 4/2015 | Grant |
| 2015/0098004 A1 | 4/2015 | Ueda |
| 2015/0130707 A1 | 5/2015 | Da Costa |
| 2015/0133221 A1 | 5/2015 | Grant |
| 2016/0051986 A1 | 2/2016 | Lin |
| 2016/0132114 A1 | 5/2016 | Rihn |
| 2016/0132116 A1 | 5/2016 | Grant |
| 2016/0259536 A1 | 9/2016 | Kudurshian |
| 2016/0313795 A1 | 10/2016 | Muramatsu |
| 2016/0361639 A1 | 12/2016 | Schmitz |
| 2017/0031442 A1 | 2/2017 | Dabic |
| 2017/0136351 A1 | 5/2017 | Long |
| 2017/0177102 A1 | 6/2017 | Long |
| 2017/0203208 A1 | 7/2017 | Sato |
| 2017/0235364 A1 | 8/2017 | Nakamura |
| 2017/0351394 A1 | 12/2017 | Sumida |
| 2018/0018020 A1 | 1/2018 | Grant |
| 2018/0250587 A1 | 9/2018 | Strahle |
| 2018/0284893 A1 | 10/2018 | Shimizu |
| 2018/0333642 A1 | 11/2018 | Strahle |
| 2019/0025916 A1 | 1/2019 | Okumura |
| 2019/0038968 A1 | 2/2019 | Machida |
| 2019/0118081 A1 | 4/2019 | Strahle |
| 2019/0224565 A1 | 7/2019 | Yamano |

FOREIGN PATENT DOCUMENTS

| | | |
|---|---|---|
| CN | 104107539 | 10/2014 |
| CN | 104798013 A | 7/2015 |
| EP | 0626634 A2 | 11/1994 |
| EP | 0852789 A1 | 7/1998 |
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 3686686 B2 | 8/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2010146507 A | 7/2010 |
| JP | 2012027875 A | 2/2012 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216071 A | 11/2014 |
| JP | 2015011470 A | 1/2015 |
| JP | 2015075912 A | 4/2015 |
| JP | 2015076097 A | 4/2015 |
| JP | 2015111417 A | 6/2015 |
| JP | 2015111542 A | 6/2015 |
| JP | 2015158912 A | 9/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150056070 A | 5/2015 |
| WO | 9712357 A1 | 4/1997 |
| WO | 2005116802 A1 | 12/2005 |
| WO | 2013099742 A1 | 7/2013 |

(56) References Cited

FOREIGN PATENT DOCUMENTS

| WO | 2015092966 A1 | 6/2015 |
|---|---|---|
| WO | 2016051986 A1 | 4/2016 |
| WO | 2016105496 A1 | 6/2016 |
| WO | 2016114269 A1 | 7/2016 |
| WO | 2017150128 A1 | 9/2017 |
| WO | 2017150129 A1 | 9/2017 |

OTHER PUBLICATIONS

Notice of Reason for Refusal for corresponding JP Application No. 2019-214619, 6 pages, dated Sep. 2, 2020.
Notice of Reason for Refusal for corresponding JP Application No. 2019-184529, 10 pages, dated Sep. 2, 2020.
International Preliminary Report on Patentability and Written Opinion for related PCT Application No. PCT/JP2017/035570, 20 pages, dated Apr. 9, 2020.
International Preliminary Report on Patentability and Written Opinion for corresponding PCT Application No. PCT/JP2017/038937, 14 pages, dated May 7, 2020.
International Search Report for related PCT Application No. PCT/JP2017/004763, 2 pages, dated Apr. 18, 2017.
International Preliminary Report on Patentability and Written Opinion for related PCT Application No. PCT/JP2017/004763, 11 pages, dated Sep. 13, 2018.
International Search Report for related PCT Application No. PCT/JP2017/017909, 7 pages, dated Jul. 18, 2017.
International Search Report for related PCT Application No. PCT/2017/004978, 4 pages, dated Mar. 14, 2017.
International Search Report for related PCT Application No. PCT/JP2017/018914, 2 pages, dated Aug. 22, 2017.
International Preliminary Report on Patentability and Written Opinion for related PCT Application No. PCT/JP2017/017909, 17 pages, dated Feb. 7, 2019.
International Preliminary Report on Patentability and Written Opinion for related PCT Application No. PCT/JP2017/018914, 13 pages, dated Feb. 7, 2019.
International Preliminary Report on Patentability and Written Opinion for related PCT Application No. PCT/PCT/2017/004978, 13 pages, dated Jan. 31, 2019.
Notification of Reasons for Refusal for related JP Application No. 2018-528391, 9 pages, dated Apr. 23, 2019.
Extended European Search Report for related EP Application No. 17833789.5, 10 pages, dated May 23, 2019.
Supplementary Search Report for relatedng European Search Report for corresponding Application No. 17833805, 12 pages, dated Jul. 19, 2019.
Decision of Refusal for related Japanese Patent Application No. 2018-528391, 10 pages, dated Jul. 9, 2019.
Extended European Search Report for related European Application No. 17759599.8, 7 pages, dated Sep. 9, 2019.
Korean Office Action for related Application No. 1020197002594, 11 pages, dated Sep. 18, 2019.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
International Search Report for corresponding PCT Application No. PCT/JP2017/035570, 8 pages, dated Dec. 26, 2017.
Office Action for corresponding Korean Application No. 10-2019-7002594, 10 pages, dated Mar. 26, 2020.
International Search report for related application PCT/JP2017/038937, 4 pages, dated Jan. 30, 2018.
Notice of Reasons for Refusal for related application JP Application No. 2020104664, 10 pages, dated Mar. 29, 2021.
Notice of Reasons for Refusal for related application JP Application No. 2019549971, 8 pages, dated Apr. 3, 2021.
Notice of Reason for Refusal for corresponding JP Application No. 2019-221160, 6 pages, dated Sep. 18, 2020.
First Office Action for corresponding CN Application No. 201780044603.3, 21 pages dated Jun. 29, 2021.
Extended European Search Report application EP Application No. 21159343.9, 11 pages, dated May 21, 2021.
Office Action for related U.S. Appl. No. 16/311,774, 10 pages, dated Apr. 27, 2020.
Office Action for related JP Application No. 2021-099339, 8 pages, dated Jun. 16, 2022.

* cited by examiner (A)

(B)

OPERATION DEVICE

TECHNICAL FIELD

The present invention relates to an operation device such as a game controller which is used for home game machines.

BACKGROUND ART

An operation device of a home game machine or the like detects a user's action of pressing a button, shaking the operation device, or the like, and transmits information indicating the detected user's action to the main body of the game machine or the like. Also, some of such operation devices present haptic senses to users by using actuators, etc.

Specifically, there has been an example in which the movable range of a locking switch which can be operated by a user is controlled to allow the user to feel the size of an object that is virtually grasped by the user.

SUMMARY

Technical Problem

Here, as a method for controlling the movable range of a movable member such as a locking switch, there has been a method including providing a restriction member that moves within the movement trajectory of the movable member and restricts the movable range of the movable member.

By this method, the movable range of the movable member can be controlled. However, if the restriction member is not exclusively used for restriction of the movable member but can be used for presentation of haptic senses in other forms, for example, various haptic senses can be presented without provision of any additional member. Accordingly, multi-functionality can be attained without an increase in the production cost.

The present invention has been made in view of the above circumstances, and one object thereof is to provide an operation device which can attain multi-functionality without an increase in the production cost.

Solution to Problem

The present invention for solving the above problem of the conventional examples, includes: a movable member that is movable within a predetermined range; and a restriction member that is disposed in a state of being movable in a movable direction of the movable member and that restricts a movable range of the movable member by coming into contact with a contact surface of the movable member in the movable direction. The restriction member is configured to be used for various applications.

According to one aspect of the present invention, the restriction member is switched between a state of being in contact with a first range of the contact surface and restricting the movable range of the movable member and a state of being in contact with a second range, the second range being different from the first range, of the contact surface and restricting the movable range of the movable member.

Advantageous Effect of Invention

According to the present invention, multi-functionality can be attained without an increase in the production cost.

DESCRIPTION OF EMBODIMENT

Figure 1:
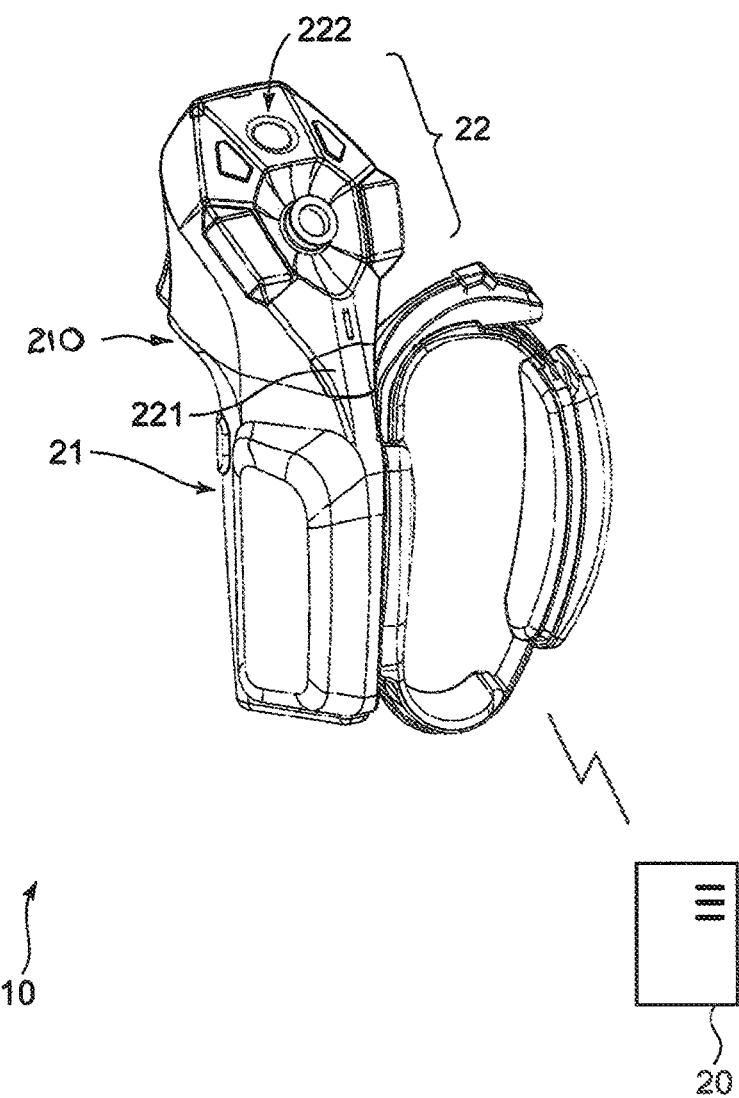
FIG. 1 is a schematic perspective view of an operation device according to an embodiment of the present invention, as viewed from the front surface side.

An embodiment according to the present invention will be explained with reference to the drawings. Note that any of the sizes of components, the ratio therebetween, and arrangement thereof are given as one example. Examples of the present embodiment are not limited to the depicted sizes, ratio, and arrangement. As depicted in FIG. 1, an information processing system according to the embodiment of the present invention includes an operation device 10, and a main apparatus 20 such as a home game machine that is wirelessly or wiredly connected to the operation device 10. The operation device 10 outputs, to the main apparatus 20, the details of an instruction operation accepted from a user. Also, the operation device 10 receives an instruction inputted from the main apparatus 20, and controls the sections.

[Configuration of Operation Device]

Figure 2:
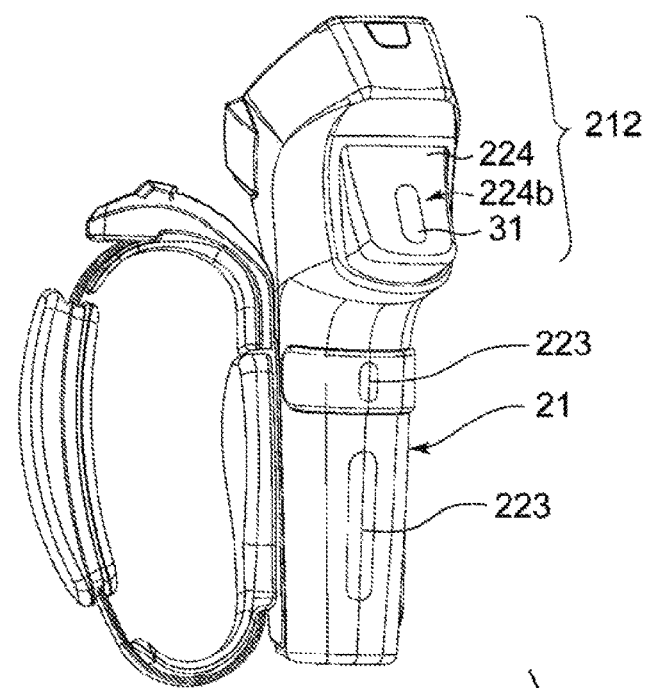
FIG. 2 is a schematic perspective view of the operation device according to the embodiment of the present invention, as viewed from the rear surface side.

In the present embodiment, the operation device 10 is set to be mounted on the left hand or right hand of a user. One example of the operation device 10 is depicted in FIGS. 1 and 2. FIG. 1 is a perspective view of the operation device 10 as viewed from the front surface side. FIG. 2 is a perspective view of the operation device 10 as viewed from the rear surface side.

The operation device 10 includes a grip part 21 that is gripped by a user, an operation part 22, and a belt part 23. The grip part 21 has a substantially polygonal column shape, and the operation part 22 is formed continuously from the grip part 21. In the example in FIGS. 1 and 2, the operation part 22 includes, on the front surface side thereof, a sensor section 221 and a button operation section 222, and includes, on the rear surface side thereof, a finger sensor 223 and a locking button 224 which corresponds to a movable section of the present invention.

In the present embodiment, the belt part 23 which is a fixing tool is fixed to either one of a left side surface and a right side surface of the operation device 10. The belt part 23 is obtained by forming a flexible belt into a ring-like shape, for example. In this example, a user who operates the operation device 10 uses the operation device 10 with the index to little fingers of the user put in the ring-shaped belt part 23 and the main body of the operation device 10 fixed at a position in contact with the base of the thumb of the user. In the example in FIGS. 1 and 2, the right surface side of the operation device 10 is pressed against a palm of the user so that the operation device 10 is in a fixed state. In addition, the operation device 10 has such a size that, when the user on whom the operation device 10 is mounted with user's fingers put in the fixing tool naturally grasps the operation device 10, the end of the user's thumb reaches the button operation section 222 disposed on the front surface side of the operation device 10. That is, in the present embodiment, at least some buttons, of the operation part 22, including the locking button 224 are arranged in a range which a finger of the user who is grasping the grip part 21 reaches.

That is, when the user on whom the operation device 10 is mounted naturally grasps the operation device 10, the user's index finger is placed on a position to touch the locking button 224 of the operation device 10, and the user grasps the grip part 21 by using the palm, the middle finger, the ring finger, and the small finger. Even if the user opens the palm from this state, the operation device 10 does not drop because the operation device 10 is fixed to the user's hand with the fixing tool.

Figure 3:
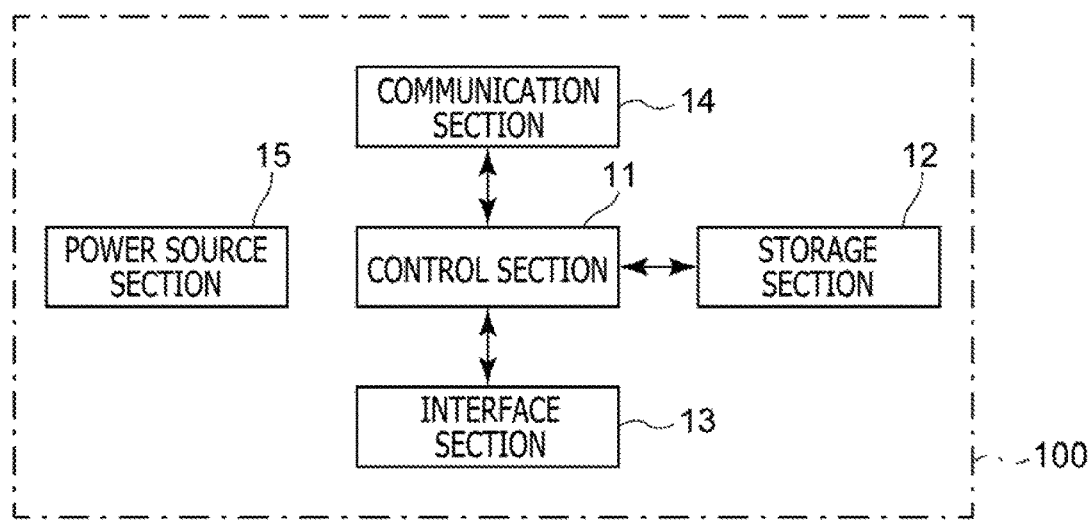
FIG. 3 is a configuration block diagram depicting an example of a circuit section of the operation device according to the embodiment of the present invention.

Moreover, as depicted in FIG. 3, the main body of the operation device 10 includes a circuit section 100. The circuit section 100 includes a control section 11, a storage section 12, an interface section 13, and a communication section 14.

The control section 11 is a program control device such as a microcomputer, and operates in accordance with a program stored in the storage section 12. In the present embodiment, the control section 11 receives, from the main apparatus 20, information for setting a haptic sense to be presented to the user via the locking button 224. On the basis of the received information, the control section 11 performs predetermined control corresponding to the haptic sense to be presented to the user in response to a user's action of moving the locking button 224. Operation of the control section 11 will be explained later. The storage section 12 is a memory device, and holds a program which is executed by the control section 11. Further, the storage section 12 operates as a work memory for the control section 11.

The interface section 13 is connected to the sections of the operation part 22, receives various signals including signals indicating a user's instruction inputted from the sensor section 221 and the button operation section 222, etc., and outputs the signals to the control section 11. Also, the interface section 13 outputs the instruction inputted from the control section 11 to the sections of the operation part 22.

The communication section 14 includes a wireless communication interface such as Bluetooth (registered trademark), a wired communication interface such as a USB or a wired LAN, or the like. The communication section 14 is connected to the main apparatus 20, and exchanges various signals with the main apparatus 20.

The sensor section 221 is disposed at a position which is slightly below a position that the end side of the user's thumb reaches, that is, at a position which is close to the proximal side of the user's thumb when the user naturally grasps the device main body 210, for example. A detectable range of the finger sensor section 221 is set to, on the front surface side of the operation device 10, a relatively wide angle range the center of which is set to a normal direction of a surface of the operation device 10 and which expands from the left surface side to the right surface side of the front surface of the operation device 10. The finger sensor section 221 detects the user's thumb within the detectable range. A position (an angle within the above angle range) where the thumb has been detected and the distance from the finger sensor section 221 to the user's thumb are detected, and detection result information including the position and the distance is outputted to the control section 11. The finger sensor section 221 may be a camera, an optical sensor, a pyroelectric sensor, a capacitive sensor or the like.

The button operation section 222 includes at least one button. When the user performs a pressing operation on the button, the button operation section 222 outputs, to the control section 11, information for specifying the button on which the pressing operation has been performed. The finger sensor 223 detects whether or not the user's middle or little finger is placed close to (or in contact with) the grip part 21 of the operation device 10. Information indicating the detection result is outputted to the control section 11.

The locking button 224 corresponds to the movable section of the present invention, and is a button that is rotationally movable about a predetermined axis and between a first position in which the locking button 224 is projected from the main body of the operation device 10 toward the rear surface side of the operation device 10 and a second position in which the locking button 224 is pressed down toward the main body side of the operation device 10. In the present embodiment, a pressing operation toward the second position may be performed on the locking button 224 with the user's index finger or the like, and, when the user's finger is released, the locking button 224 may be urged by an elastic body or the like so as to restore to the first position.

The operation device 10 according to the present embodiment presents a haptic sense to a user's finger through the locking button 224, thereby expresses a feel of a virtual object which is virtually touched by the user. Specifically, the movable range of the locking button 224 is changed, and further, a reaction force (a force resistant against the user's force of pressing the locking button 224) to the user's operation is presented, whereby a haptic sense is presented to the user. Note that the embodiment of the present embodiment is not limited to this example. For example, not the locking button 224 but a member that is disposed close to the user's palm may be used as the movable section to present a haptic sense to the user's palm. Thus, the position and form of the movable section are not limited to those exemplified here as long as a haptic sense can be presented to a portion of the user's hand.

Figure 4:
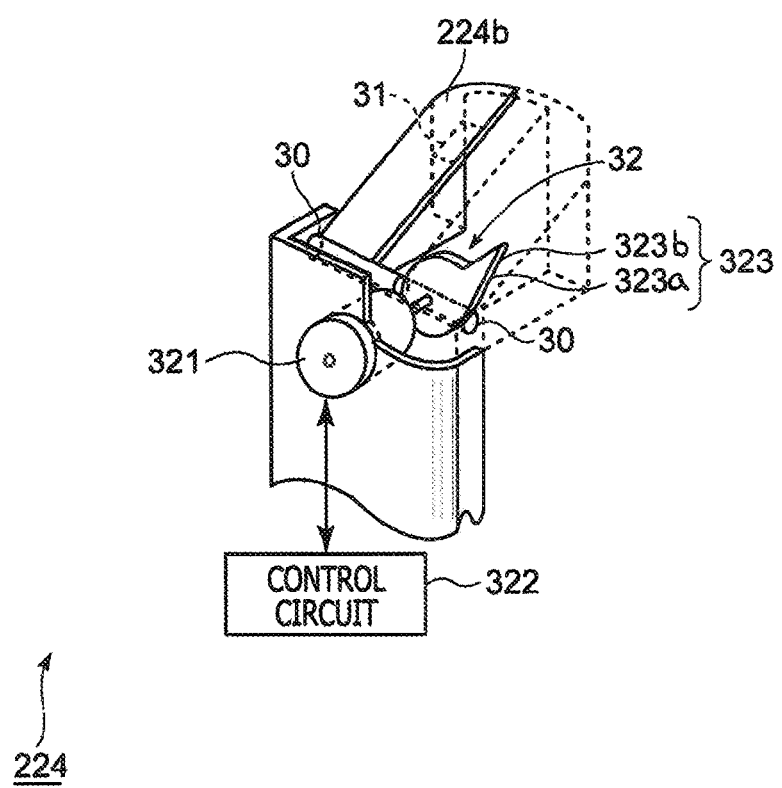
FIG. 4 is a schematic perspective cross-sectional view of a structure example of a locking button of the operation device according to the embodiment of the present invention.

In the present embodiment, the locking button 224 includes a button cover 224b which is a movable member, a button cover support section 30, a position sensor 31 that detects the position of the locking button 224, and a restriction section 32 that restricts the movable range of the button cover 224b to a designated range, as depicted in FIG. 4. Also, for example, the restriction section 32 includes a motor 321 serving as an actuator, a control circuit 322 for the motor 321, and an arm 323 which is a restriction member that is driven by the actuator. FIG. 4 is a schematic cross-sectional view of the locking button 224 taken along a plane including the rotational axis of the arm 323.

Here, the position sensor 31 is a potentiometer or the like attached to a hinge which is the rotational center of the arm 323, and outputs information regarding the rotational angle of the arm 323. Alternatively, the position sensor 31 may be a potentiometer or the like attached to a hinge which is the rotational center of not the arm 323 but the locking button 224. In this case, the position sensor 31 outputs information regarding the rotational angle of the locking button 224.

In one example of the present embodiment, the arm 323 has a plate cam shape, and specifically, includes an arm body 323a that has a disc shape and an arm section 323b that is projected in a tangential direction of one point on the outer circumference of the arm body 323a. In the example in FIG. 4, the center of the arm body 323a that has a disc shape is fixed to a rotational shaft of the motor 321. A recess (C) in which the arm body 323a of the arm 323 is housed is formed in the inner surface (the operation device 10 side surface) of the button cover 224b. The recess (C) may be formed asymmetrically with respect to the rotational axis of the arm 323.

Also, the outer surface of the button cover 224b serves as a press surface which is pressed by a user's finger. Regions, of the inner surface of the button cover 224b, excluding the recess (C) each serve as a contact surface with which the arm 323 comes into contact. The button cover support section 30 has a hinge fixed to the main body side of the operation device 10, and supports the button cover 224b in a rotatable state within a predetermined angle range (an area between the first position and the second position) about the hinge. Further, the button cover support section 30 urges the button cover 224b toward the first position by using an elastic body such as a spring. Accordingly, without user's pressing, the button cover 224b moves to the first position.

The button cover 224b can be pressed to a position (referred to as a contact position) that is between the first position in which the button cover 224b is projected toward the rear surface side of the operation device 10 and the second position in which the button cover 224b is pressed down toward the main body side of the operation device 10 and that is a position where the contact surface of the button cover 224b is brought into contact with the arm member 323b of the arm 323. Thus, when the user performs an action of gripping the operation device 10 and presses the press surface of the button cover 224b by using the index finger, the button cover 224b moves to the contact position without providing feeling of any special force of resistant (while being resistant only to the urging force of the button cover support section 30), and, upon coming into contact with the arm 323 at the contact position, the button cover 224b presents a haptic sense to make the user feel as if the user has touched something hard.

When the user further performs an action of strongly gripping the operation device 10 and thereby increases the force of pressing the button cover 224b, the motor 321 is rotated to move the arm 323 back to the main body side of the operation device 10. As a result, a haptic sense to make the user feel as if an object is deformed by the gripping force can be presented. At this time, the rotational speed of the motor 321 is changed according to the user's force of pressing the button cover 224b, so that the difference in hardness can be simultaneously presented.

As explained above, the arm 323 is attached to the rotational shaft of the motor 321. Thus, the movable range of the button cover 224b is restricted according to the rotational angle θ of the motor 321. Specifically, with the arm 323 in the example in FIG. 4, the position of a leading end (contact portion) of the arm member 323b is moved within the movable range of the button cover 224b according to the rotational angle of the motor 321. Accordingly, the button cover 224b is movable to the contact position at which the button cover 224b comes into contact with a contact portion of the arm member 323b.

Figure 5:
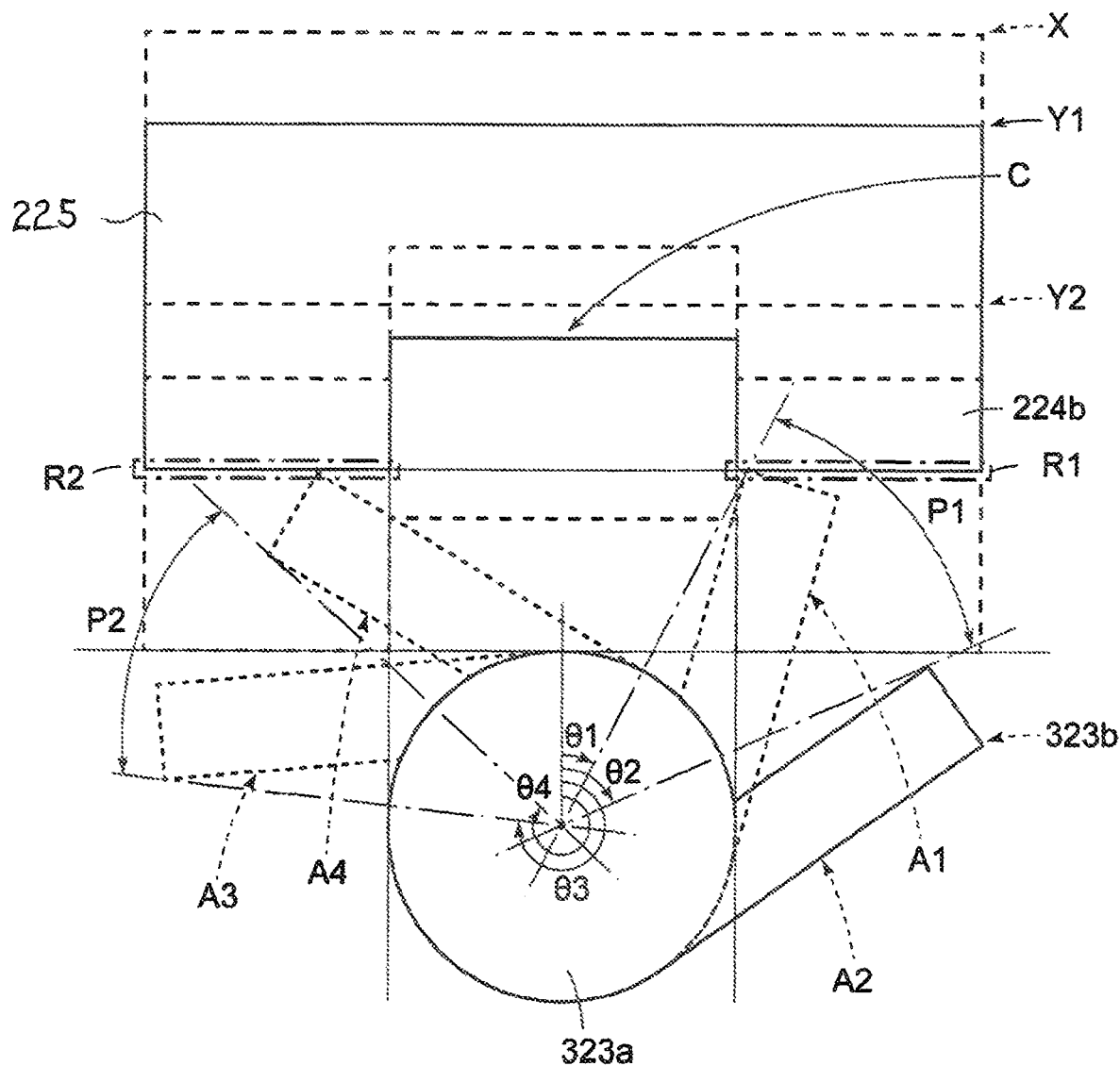
FIG. 5 is a schematic view depicting the relationship between the locking button and an arm of the operation device according to the embodiment of the present invention.

FIG. 5 schematically depicts the relationship between the arm 323 and the button cover 224b of the example in FIG. 4. As schematically depicted in FIG. 5, when the angle θ formed between the lengthwise direction (projected direction) of the arm member 323b and a movement direction (a direction opposite to a movement direction when the button cover 224b is pressed) of the button cover 224b falls within a range of θ2 to θ3 in FIG. 5, the arm 323 does not restrict the movement range of the button cover 224b. Therefore, in this case, the press surface of the button cover 224b is freely movable between the first position (X in FIG. 5) and the second position (Y2 in FIG. 5) (while being resistant only to the urging force of the button cover support section 30). Note that the second position in this case is a position in which the button cover 224b cannot be mechanically pressed any more, and is referred to as a lowest point hereinafter.

On the other hand, when the arm 323 is rotated by the motor 321 and the angle θ formed between the lengthwise direction (projected direction) of the arm member 323b and the movement direction of the button cover 224b falls within a range of θ1 to θ2 (range P1) in FIG. 5 or a range of θ3 to θ4 (range P2), the leading end of the arm member 323b is located within the movement trajectory of the button cover 224b. Specifically, in the case where the angle θ formed between the lengthwise direction (projected direction) of the arm member 323b and the movement direction of the button cover 224b falls within the range of θ1 to θ2 in FIG. 5, when the button cover 224b is pressed, the leading end of the arm member 323b comes into contact with a range (a first range R1 of the contact surface), of the contact surface of the button cover 224b, on a side where the arm member 323b is located, between the first range (R1) and a second range (R2) which are disposed so as to sandwich the recess (C). Further, movement of the button cover 224b to the pressing-down direction from this contact position is restricted.

Thus, in the case where the angle θ formed between the lengthwise direction (projected direction) of the arm member 323b and the movement direction of the button cover 224b falls within the range of θ1 to θ2 in FIG. 5, when θ is closer to θ1 which is close to "0," the contact position (the position Y in FIG. 5) between the arm member 323b and the button cover 224b is closer to the first position (X in FIG. 5) of the button cover 224b (Y1 is the closest position).

Note that the arm 323 is controlled such that the arm member 323b is not rotated to θ ranging from 0 to θ1 or from θ4 to 360 degrees.

In the case where the angle θ formed between the lengthwise direction (projected direction) of the arm member 323b and the movement direction of the button cover 224b falls within the range of θ3 to θ4 in FIG. 5, when the button cover 224b is pressed, the leading end of the arm member 323b comes into contact with the range (the second range R2 of the contact surface), of the contact surface of the button cover 224b, on the side where the arm member 323b is located, between the first range (R1) and the second range (R2) which are disposed so as to sandwich the recess (C). Further, movement of the button cover 224b to the pressing-down direction from this contact position is restricted.

Thus, in the case where the angle θ formed between the lengthwise direction (projected direction) of the arm member 323b and the movement direction of the button cover 224b falls within the range of θ3 to θ4 in FIG. 5, when θ is closer to θ4 which is close to "360 degrees," the contact position (the position Y in FIG. 5) between the arm member 323b and the button cover 224b is closer to the first position (X in FIG. 5) of the button cover 224b (the closest position is Y1). Accordingly, the pressing allowable amount (movable range) of the button cover 224b is restricted.

The motor 321 of the restriction section 32 is a motor, such as a servomotor or a stepping motor, the rotational angle of which can be controlled. The motor 321 may be a so-called geared motor having an integrated gear head. The motor 321 is rotationally operated with a current inputted from the control circuit 322.

For example, the control circuit 322 of the motor 321 receives an input of a torque control value τ and rotational indication information D from the control section 11. The control circuit 322 supplies, to the motor 321, a current having a magnitude corresponding to the torque control value τ in a direction corresponding to the rotational direction information D. The motor 321 is rotated in the designated rotational direction by torque corresponding to the current. Specifically, in the case where the rotational direction is "up," the motor 321 is rotated in a direction for moving the leading end (contact portion) of the arm 323 toward the button cover 224b side. In the case where the rotational direction is "down," the motor 321 is rotated in a direction for moving the leading end (contact portion) of the arm 323 toward the main body side of the operation device 10.

In the case where the rotational direction is "up," rotation is conducted in the direction for moving the leading end (contact portion) of the arm 323 toward the button cover 224b side, the user's force (which is transferred, through the arm 323, as a rotational force in a direction opposite to the rotational direction of the motor 321) of pressing the button cover 224b is compensated for the torque from the motor 321, and the button cover 224b moves toward the second position at a speed corresponding to an amount by which the pressing force is greater than the torque. Further, when the pressing force is equal to the torque, the button cover 224b is in a state of standing still at the current position.

In still another example, the control circuit 322 may receive, from the control section 11, an input of a current value or voltage value instead of the torque control value τ. In this case, the control circuit 322 supplies, to the motor 321, a current the magnitude of which corresponds to the inputted value, or applies a voltage the magnitude of which corresponds to the inputted value.

Moreover, the control circuit 322 may receive, from the control section 11, an input of the rotational angle θ instead of the torque control value τ. In this case, the control circuit 322 controls rotation of the motor 321 to the inputted rotational angle θ, thereby rotates the leading end (the contact portion) of the arm 323 to the button cover 224b side. Note that control for rotating a motor to a determined rotational angle and stopping the motor, is widely known, and thus, a detailed explanation thereof is omitted here.

In this case, by receiving an input of a first angle θa between θ1 and θ2 and a second angle θb between θ3 and θ4, the control circuit 322 can perform switching between a state of being in contact with the first range of the contact surface of the button cover 224b and restricting the movable range thereof, and a state of being in contact with the second range, the second range being different from the first range, of the contact surface of the button cover 224b and restricting the movable range thereof.

[Configuration of Main Apparatus]

The main apparatus 20 includes a camera to capture an image of a user, detects the position of a user's hand in the real space at every predetermined timing, for example, and obtains, through computation, a virtual position of the user's hand in a game space corresponding to the detected position in the real space. On the basis of information regarding the obtained virtual position, a haptic sense to be presented to the user's hand is determined in the game processing. In one example, when detecting that a user holding a gun in a game is trying to pull a trigger, the main apparatus 20 outputs, to the operation device 10, an instruction to perform control to present a haptic sense of pulling a gun's trigger.

Figure 6:
FIG. 6 is a functional block diagram depicting an example of the operation device according to the embodiment of the present invention.

Next, operation of the control section 11 of the operation device 10 according to an embodiment of the present invention will be explained. In the present embodiment, as depicted in FIG. 6, the control section 11 includes a reception section 51 that receives an instruction regarding control of a haptic sense, a haptic sense control section 52 that generates an instruction for controlling a haptic sense to be presented to a user via the locking button 224 for the user on the basis of the received instruction, and an output section 53 that outputs the generated instruction.

The reception section 51 receives, from the main apparatus 20, an instruction regarding control of a haptic sense. In the present embodiment, the instruction is transmitted by being included in an instruction data packet which is repeatedly transmitted from the main apparatus 20 at every predetermined timing. Here, the transmission timing of the instruction data packet may be approximately 10 to 100 Hz (10 times or 100 times per second). Also, the instruction data packet includes a header part H including a packet identifier (N), a haptic sense designating part F, and the remaining data part D. The haptic sense designating part F includes information (M) for specifying control modes and control information (P) set for each of the control modes.

By receiving this packet, the reception section 51 receives the information (M) for specifying control modes and the control information (P) set for each of the control modes. Specific examples of these information will be described later.

In accordance with the control mode specified by the information received by the reception section 51, the haptic sense control section 52 controls a haptic sense to be presented in response to an action of moving the locking button 224 which is the movable section, by using the control information received simultaneously with the information for specifying the control mode. In an example of the present embodiment, the haptic sense control section 52 controls a haptic sense to be presented to the user by controlling the motor 321 which is an actuator. Operation of the haptic sense control section 52 will be described in detail later.

The output section 53 outputs, to the control circuit 322 of the motor 321, a control instruction (a torque control value, a current value, a voltage value or the like) inputted from the haptic sense control section 52.

Here, operation of the haptic sense control section 52 will be explained with use of a specific example. In one example of the present embodiment, control modes which are designated by an instruction from the main apparatus 20 include (1) a first control mode for controlling the actuator by designating information regarding a target position of the actuator and control gains, (2) a second control mode for controlling the actuator by designating the voltage value of a voltage to be supplied to the actuator or the current value of a current to be supplied to the actuator, and (3) a third control mode for instructing the operation device 10 side to control the actuator by designating which setting information is to be used among plural pieces of setting information where control information regarding the position range of the actuator or the movable section has been set.

[Example of Designating Target Position and Gain]

First, in the case (1) where information regarding the target position θt of the actuator and control gains is designated (the first control mode), the information regarding control gains received from the main apparatus 20 includes a gain (p gain p) for a positional difference and a gain (d gain d) for a speed. In this case, the haptic sense control section 52 receives, as positional information regarding the actuator from the position sensor 31, information regarding the rotation angle θ of the arm 323 which is rotated by pressing-down performed on the locking button 224. In this example, the target position of the actuator included in the control information is designated as a rotation angle θt of the arm 323.

Next, the haptic sense control section 52 obtains the torque control value τ, of the motor 321 which is the actuator, to be outputted to the control circuit 322, by $\tau = (p \times |\theta - \theta t| + d \times \Delta\theta)/Gk$ in which G represents a gain constant. $\Delta\theta$ represents the difference between a value θp inputted last from the position sensor 31 and a value θ currently inputted from the position sensor 31, which is $\Delta\theta = \theta - \theta p$

|x| means to calculate the absolute value of x. The haptic sense control section 52 outputs the calculated torque control value τ to the output section 53.

Moreover, in this example, on the basis of the difference θ−θt between the actual angle of the arm 323 and the target position, the haptic sense control section 52 outputs, to the output section 53, a "first direction (a clockwise direction in the example in FIG. 5)" as the rotational direction of the motor 321 when the relationship between the target position θt and θ satisfies θ>θt, or a "second direction (a counter-clockwise direction in the example in FIG. 5)" as the rotational direction of the motor 321 when θ<θt. Note that determination of the rotational direction may be made with use of not θ−θt but the sign of the torque control value τ such that the "first direction" is outputted as the rotational direction to the output section 53 when τ>0, and otherwise the "second direction" is outputted as the rotational direction. Such determination is made because the fact that, in some control methods, the rotational direction of the motor 321 may be the "second direction" even when θ>θt is taken into consideration.

Note that, in this example, the haptic sense control section 52 may be configured to output, as the torque control value τ, "0" to the output section 53 when |θ−θt| is less than a predetermined value.

In addition, the target position of the actuator may be designated as information regarding the position (rotational angle) of the locking button 224 which is the movable section. In this case, the position sensor 31 outputs information regarding the rotational angle of not the arm 323 but the locking button 224.

[Example of Designating Voltage Value/Current Value]

In the case (2) where the voltage value of a voltage to be supplied to the actuator or the current value of a current to be supplied to the actuator is designated (the second control mode), the haptic sense control section 52 directly outputs a received current value or voltage value to the output section 53. In this example, the control circuit 322 having received an input of the current value or voltage value via the output section 53 supplies the current value or the voltage value to the motor 321. In this example, the reception section 51 receives information indicating the rotational direction (information indicating the "first direction" or the "second direction") together with the current value or the voltage value from the main apparatus 20. Subsequently, the haptic sense control section 52 directly outputs the information indicating the rotational direction to the output section 53. Note that, here, the information indicating the rotational direction is not limited to information indicating the "first direction" or the "second direction," and may be information indicating that the rotational direction should be reversed. In this case, the haptic sense control section 52 outputs, to the output section 53, a rotational direction (information indicating the "second direction" when the current rotational direction is the "first direction," and indicating the "first direction" when the current rotational direction is the "second direction") that is opposite to the current rotational direction.

[Example of Designating Duration Time]

In the example of designating a voltage value or a current value, the reception section 51 may, from the main apparatus 20, receive information for specifying the second control mode or receive information regarding a control duration time as well as the voltage value or the current value.

In this case, the haptic sense control section 52 measures an elapse time from a time point at which a current value or a voltage value is outputted to the control circuit 322, by using time measuring means (which is not depicted, and may be publicly known one that can be realized by a clock signal generating section and a counter, for example), and instructs the control circuit 322 to stop operation of the motor 321 (for example, outputs "0" as the current value) when the duration time specified by the received information has elapsed. Accordingly, even in the case where no new information regarding control of the actuator is received from the main apparatus 20, the process can be ended at a time point at which a designated time has elapsed, and even when communication with the main apparatus 20 is interrupted, an intended haptic sense can be presented by a process which is being executed at the main apparatus 20 side.

[Example of Designating Control Pattern]

Next, an example (3) for instructing the operation device 10 side to control the actuator by designating which setting information is to be used among plural pieces of setting information where control information for the positional range of the actuator or the movable section has been set (the third control mode), will be explained.

Note that, in the present embodiment, the positional range of the actuator actually represents the range of the rotational angle of the arm 323. This angle range may be the range itself of the rotational angle of the rotational shaft of the actuator, or may not be the above range (for example, in the case where the arm 323 is connected via a speed reduction gear). In the latter case, the position of the output side of the speed reduction gear corresponds to the position of the actuator.

Figure 7:
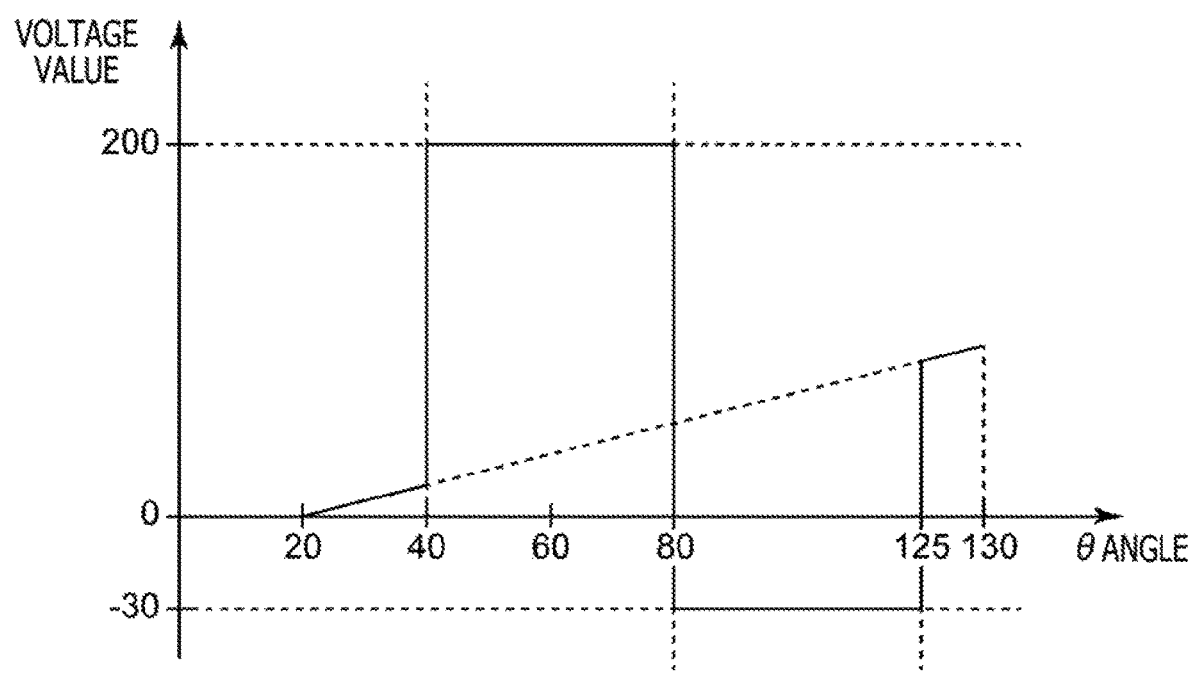
FIG. 7 is an explanatory diagram depicting an example of controlling the arm of the operation device according to the embodiment of the present invention.
Figure 7:
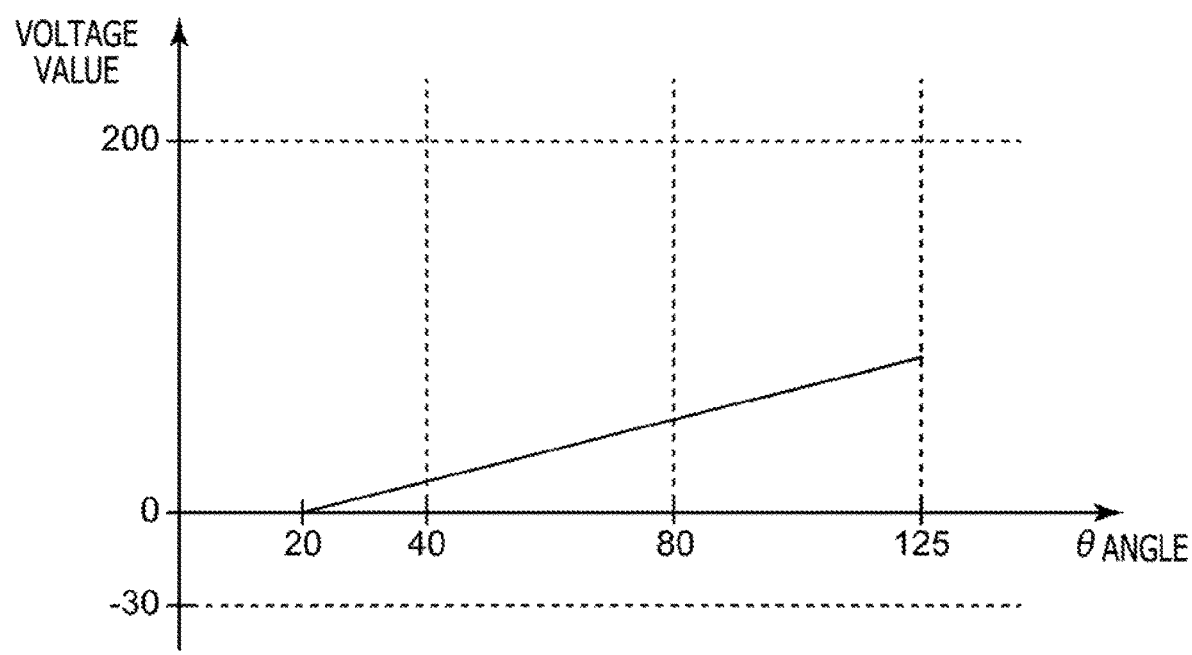

In this example, setting information at least including one pair of the positional range of the actuator or the movable section and control information is preliminarily stored in the storage section 12 of the operation device 10. For example, such information includes a pair of information θbmin indicating the lower limit of the positional range of the actuator as the information indicating the positional range, and the target position θt1=40 and control gains p1 and d1 as the control information, or a pair of information θbmin indicating the lower limit of the positional range of the actuator as the information indicating the positional range, and voltage value information CV (or current value information CI) as the control information, as depicted in FIG. 7 depicting an example in which a gun is shot in a game. Note that a case of using the positional range of the actuator is exemplified in FIG. 7 and the following explanation. However, in the case where the positional range of the movable section is used, information indicating the positional range of the movable section may be used instead of the positional range of the actuator in FIG. 7 and the following explanation.

In this example, the haptic sense control section 52 receives information regarding the rotational angle θ of the arm 323 or the locking button 224 which is the movable section, refers to control information associated with information regarding the positional range including the received rotational angle θ in designated setting information, and controls the actuator by a similar process to that in the first control mode when the referred control information indicates the pair of the target position θt and control gains, and controls the actuator by a similar process to that in the second control mode when the referred control information indicates a voltage value or a current value.

That is, in the example in FIG. 7, the positional range is lower than θbmin (e.g., 40), the mode is switched to the "first direction mode" such that control is performed with use of the target position θt1 and control gains p1 and d1 (the rotational direction is not depicted but is set to the first direction) while θbmin=20 to θbmin=40 which is the lower limit of the next positional range. Further, during the "first direction mode," control to adjust the voltage value CV to 200 is performed while θbmin=40 to θbmin=80 which is the lower limit of the next positional range, and control to adjust the voltage value CV to −30 is performed while θbmin=80 to θbmin=125 which is the lower limit of the next positional range (in FIG. 7(A), control to the first direction is performed when the voltage value CV is positive, and control to the second direction is performed when the voltage value CV is negative).

Also, when the positional range is equal to or greater than θbmin (when the lowest point θ2 at which contact with the first range of the contact surface of the button cover 224b in FIG. 5 can be made is set to 130, θbmin is set to 125, for example), the mode is switched to the "second direction mode" to perform control with use of, as the control information, the target position θt2=20 and control gains p2 and d2 (in FIG. 7(B), the rotational direction is the second direction). Thus, the setting information may mixedly include control information according to the first control mode and control information according to the second control mode.

According to this example, as depicted in FIG. 7(A), when the user presses the locking button 224 from the initial position (the rotational angle θ of the arm 323 is set to 0), the locking button 224 is pressed down without any resistance until the position of the arm 323 achieves θ=20 (while being resistant only to an urging force for restoring the locking button 224 to the initial position), a haptic sense of gradually increasing resistance is presented while the position θ of the arm 323 is 20 to 40, a haptic sense of a relatively large reaction force (a force for pushing back) is presented while the position θ of the arm 323 is 40 to 80, and a haptic sense for providing a feeling as if the reaction force has suddenly disappeared is presented after the locking button 224 is pressed to the position θ=80 of the arm 323.

This exactly corresponds to a situation in which, when a trigger of a gun or the like is pulled, play is first provided, a slight reaction force is applied until a firing hammer is pulled, a strong force is required to restore the firing hammer, a bullet is fired by the firing hammer having been restored, and then, the trigger becomes free, that is, corresponds to a situation in which a haptic sense corresponding to feeling of a knock back of a gun is presented.

Also, the haptic sense control section 52 may change the gains by estimating the speed or the force according to movement of a user's finger on the basis of the change rate of the positional information regarding the arm 323. Specifically, the control gains may be varied according to whether movement of a user's finger (the change rate of the positional information regarding the arm 323) is lower than a predetermined threshold or greater than the predetermined threshold. For example, the control gains may be set to be larger (to present a larger reaction force) when movement of a user's finger (the change rate of the positional information regarding the arm 323) is less than the predetermined threshold, than that when movement of a user's finger is greater than the threshold.

[Presentation of Vibration]

In the present embodiment, the locking button 224 may be vibrated to present the vibration to a user. Specifically, the main apparatus 20 gives an instruction to vibrate the locking button 224 between a first position and a second position which will be explained later.

Next, when receiving the instruction to present vibration, the control section 11 of the operation device 10 performs switching, at every predetermined timing, between the first control mode of setting the target position of the actuator to the first position and a second control mode of outputting information for reversing the rotational direction together with a current value or a voltage value.

Thus, vibration is presented by this method for switching the mode to the first control mode and the second control mode alternately, so that the upper vibration limit position (the first position) can be controlled. Furthermore, by this method, the timing for performing switching between the first control mode and the second control mode is changed, so that the second position can be also controlled because the movement distance of the arm 323 (which is equal to the movement distance of the locking button 224 when the user is pressing the locking button 224) depends on the length of the time during which control of the second control mode is performed, and because the distance is substantially fixed, irrespective of the magnitude of the user's force of pressing the locking button 224 in the case where switching from the second control mode to the first control mode is performed at every fixed time period.

Note that, in the aforementioned case, the control section 11 may switch the target position between the first position and the second position at every predetermined time period in the first control mode, instead of switching the mode between the first control mode and the second control mode alternately. Alternatively, the rotational direction may be alternately switched at every predetermined time period by use of the second control mode.

Further, regarding the timing of performing switching between the first control mode and the second control mode, for example, the control section 11 may detect the relative positions of the locking button 224 and the arm 323 during driving to the first direction, driving may be performed in the first control mode until the arm 323 and the locking button 224 come into contact with each other, and driving may be performed in the second control mode after the contact.

Also, in control of presentation of vibration, the following control may be performed on the basis of information regarding the range of a position detected by the position sensor 31. Specifically, for example, in the case where information regarding the designated first and second (upper limit side and lower limit side) positions indicates 20 degrees and 60 degrees but position information detected by the position sensor 31 indicates a 20 degree width from 40 degrees to 60 degrees due to the influence of a user's force of pressing the locking arm, the control section 11 controls the upper limit side or lower limit side (e.g., the second position disposed on the lower limit side) to obtain an intended vibration width. For example, control to 40 degrees and 80 degrees may be performed. Note that also the upper limit side may be controlled.

Furthermore, in the present embodiment, in the case where vibration is presented by switching of the target position between the first position and the second position at every predetermined time period in the first control mode, the first position and the second position may be set such that:

(Position setting A) the first position θp and the second position θq are adjusted to satisfy θp<θq, and both θp and θq are at least θ1 but less than θ3;
(Position setting A) the first position θp and the second position θq are adjusted to satisfy θp<θq, θp is at least θ1 but less than θ2,and θq satisfies θ3<θq≤θ4; or
(Position setting C) the first position θp and the second position θq are adjusted to satisfy θp<θq, and θp and θq satisfy θ3<θp and θq≤θ4, respectively.

In position setting A, the arm 323 is caused to come into contact with the first range of the contact surface of the button cover 224b, whereby vibration is presented. In position setting C, the arm 323 is caused to come into contact with the second range of the contact surface of the button cover 224b, whereby vibration is presented. In position setting B, the state where the arm 323 is caused to be in contact with the first range of the contact surface of the button cover 224b and the state where the arm 323 is caused to be in contact with the second range, the second range being different from the first range, of the contact surface of the button cover 224b are alternately repeated, whereby vibration is presented.

[Control Based on Game Program]

Moreover, the main apparatus 20 may output an instruction for setting a control gain in game processing. For example, in a game for continuously shooting a gun, the control gain may be changed and controlled according to the number of remaining bullets.

Furthermore, the main apparatus 20 may perform control to reduce the gain according to a predetermined condition. Specifically, the control gain may be controlled (for example, the control gain is controlled to be reduced) on the basis of, as such the predetermined condition, the total play time (the total of play time periods), the number of game play times, a time period (play time period) from start of each time play, or an elapsed time from start of a predetermined operation. For example, in the case where an operation of keeping on shooting a machine gun is performed, control is performed to reduce the control gain according to the elapsed time from start of an operation of shooting the machine gun. Accordingly, while a sense of continuously shooting the machine gun is given, continuous presentation of strong vibration can be prevented. This improves the operability.

[Another Configuration of Button Cover]

Figure 8:
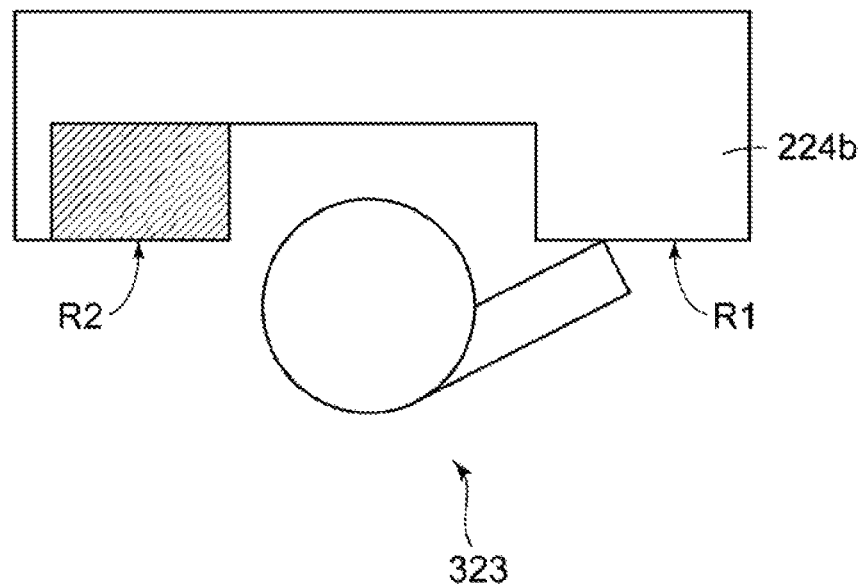
FIG. 8 is an explanatory diagram depicting another structure example of the locking button of the operation device according to the embodiment of the present invention.

Further, in the present embodiment, in the contact surface of the button cover 224b of the locking button 224, the first range (R1) and the second range (R2) which are disposed so as to sandwich the recess (C) may be formed from raw materials having different Young's moduli. Specifically, the second range R2 of the main body of the button cover 224b may be formed to be slightly further recessed than the first range R1, and a raw material (e.g., an elastic body such as a rubber or a sponge) having a Young's modulus different from that of the raw material (e.g., plastic) of the main body of the button cover 224b may be pasted, for example, to the recessed portion in the second range R2 so that the first range (R1) and the second range (R2) are formed from raw materials having different Young's moduli (FIG. 8). Note that, in FIG. 8, a portion formed from a raw material having a Young's modulus different from that of the remaining portion of the button cover 224b is hatched for understanding. However, hatching does not indicate the type of the raw material.

In this example, as explained above, vibration can be presented in different forms on the basis of whether the vibration is presented by the arm 323 caused to come into contact with the first range of the contact surface of the button cover 224b or by the arm 323 caused to come into contact with the second range of the contact surface of the button cover 224b. For example, in the case where the raw material of the first range is plastic and the raw material of the second range is a rubber, when vibration is presented by the arm 323 caused to come into contact with the first range of the contact surface of the button cover 224b, well-modulated clicking vibration is obtained, and when vibration is presented by the arm 323 caused to come into contact with the second range of the contact surface of the button cover 224b, muffled vibration is obtained.

In addition, when vibration is obtained by alternately repeating the state where the arm 323 is caused to come into contact with the first range of the contact surface of the button cover 224b and the state where the arm 323 is caused to come into contact with the second range, the second range being different from the first range, of the contact surface of the button cover 224b, different forms of vibration can be alternately provided. Moreover, when vibration is presented by keeping the state where the arm 323 is in contact with the first range of the contact surface of the button cover 224b for a while, and then alternately repeating the above stat and the state where the arm 323 is caused to come into contact with the second range of the contact surface of the button cover 224b, a change from clear vibration to unclear vibration can be presented.

[Control of Position of Locking Button]

Further, in the present embodiment, a lock section that is locked with the arm 323 which is the restriction member, thereby interlocks movement of the arm 323 with movement of the arm 323 may be further provided on the contact surface of the button cover 224b of the locking button 224 which is the movable member.

Specifically, in the case where the locking section is provided, the contact surface side of the button cover 224b is in a state where the recess portion C is made larger by cutting the portion of the second range R2 of the contact surface in FIG. 5. Also, a catcher 225 having a C-shaped cross section that is engaged with the arm member 323b when the arm member 323b of the arm 323 comes close to the contact surface side of the button cover 224b in the recess portion C is oscillatably hung from the button cover 224b. Moreover, in this case, at least a portion, of the arm member 323b, that is engaged with the catcher 225 is formed into a cylindrical shape.

When the arm member 323b is moved to a position to be able to be engaged with the catcher 225, the cylindrical portion of the arm member 323*b* is engaged with the C-shaped portion of the catcher 225. Thereafter, movement of the button cover 224*b* can be interlocked with movement of the arm member 323*b*.

In addition, the C-shaped portion of the catcher 225 is formed to be engaged with the arm member 323*b* such that, when the button cover 224*b* is moved to the lower end (to the lowest point) and then the arm member 323*b* keeps on being moved in the first direction (in the direction to reduce θ in FIG. 5), the engaged state between the catcher 225 and the arm member 323*b* is canceled.

Note that, although the example in which the arm member 323*b* is locked with the catcher 225 through engagement has been explained here, the present embodiment is not limited to this example. For example, in the contact surface of the button cover 224*b* of the locking button 224, a magnet may be disposed in the second range R2 of the main body of the button cover 224*b*, and the arm member 323*b* may be made from metal or the like which is attracted by the magnet.

In this case, when the arm member 323*b* comes close to the second range R2 of the contact surface of the button cover 224*b*, the arm member 323*b* is attracted by the magnet disposed in the second range R2, and enters a state of being magnetically locked. Thereafter, the button cover 224*b* can be interlocked with movement of the arm member 323*b*. Also in this case, when the button cover 224*b* is moved to the lower end (to the lowest point) and the arm member 323*b* further keeps on being moved in the first direction (the direction to reduce θ in FIG. 5), the magnetic locking is released at a point where the movement force of the arm member 323*b* exceeds the attracting force of the magnet. Thus, interlocking between the arm member 323*b* and the button cover 224*b* is canceled.

According to this example of the present embodiment, the state where the arm member 323*b* and the button cover 224*b* are interlocked with each other is established, and an operation of directly moving the button cover 224*b* by movement of the arm member 323*b* can be performed. In addition, the interlocking is canceled, and an operation of causing the arm member 323*b* to knock the contact surface (first range R1) of the button cover 224*b* is performed, whereby vibration can be presented.

[Contact with Casing]

In the explanation given so far, the arm 323 is configured to be able to move even while the angle θ formed between the longitudinal direction (projected direction) of the arm member 323*b* and the movement direction of the button cover 224*b* has exceeded 180 degrees, as depicted in FIG. 5. However, the present embodiment is not limited to this example.

That is, in a certain example of the present embodiment, the arm 323 may come into contact with (the inner side of) the casing of the operation device 10 within the range of 180 degrees>θT>θ2. In this case, the arm 323 cannot rotate to an angle θ larger than θT (that is, the arm 323 in this case is in a state of being unable to come into contact with the second range R2 of the button cover 224*b*).

In this example of the present embodiment, the control circuit 322 causes the arm 323 to rotate from the angle of θT>θP>θ1 (or θT>θP'>θ2) to the angle θT in accordance with an instruction inputted from the control section 11, and causes the leading end (leading end lower side) of the arm 323 to come into contact (collide) with the inner side of the casing of the operation device 10, whereby the operation device 10 can be entirely vibrated.

Here, when the control circuit 322 receives an input of θP and an input of θT alternately as the rotational angle of the arm 323, and repeatedly controls the rotational angle of the arm 323 between the angle θP and the angle θT, the state where the arm 323 is in contact with the button cover 224*b* and the state where the arm 323 is in contact with the inner side of the casing are alternately repeated, whereby vibration can be presented via the button cover 224*b* and via the entire casing.

Moreover, when the control circuit 322 receives an input of θP' and an input of θT alternately as the rotational angle of the arm 323, and repeatedly controls the rotational angle of the arm 323 between the angle θP' and the angle θ, the state where the arm 323 is not in contact with the button cover 224*b* (the state where the arm 323 does not enter the movement trajectory of the button cover 224*b*) and the state where the arm 323 is in contact with the inner side of the casing are alternately repeated, whereby vibration obtained only via the casing can be presented.

Thus, since the control circuit 322 receives an input of each rotational angle, the arm 323 can move between a state of being in contact with the first range of the contact surface of the button cover 224*b* and restricting the movable range and a state of being in contact with the casing.

In this example, the first range of the contact surface of the button cover 224*b* which is the movable member and a portion, of the casing, with which at least the arm 323 that is the restriction member comes into contact may be formed from raw materials having different Young's moduli.

For example, when the first range R1 of the main body of the button cover 224*b* is the raw material itself (e.g., plastic) of the button cover 224*b*, a raw material (e.g., an elastic body such as a rubber or a sponge) having a different Young's modulus may be pasted to a portion, of the casing inner side, with which the arm 323 comes into contact.

[Calibration] Further, in the case where the arm 323 is configured to come into contact with the inner side of the casing, an angle representing the rotational limit of the arm 323 is fixed to the contact position θT on the inner side of the casing, and thus, an output from the position sensor 31 when the arm 323 is caused to come into contact with the inner side of the casing represents the angle θT. Therefore, the maximum value of an output from the position sensor 31 in the state where the arm 323 is controlled, by the control circuit 322, to rotate in a direction to come into contact with the inner side of the casing is adjusted to θT, whereby an output value from the position sensor 31 can be calibrated. For this calibration process, a widely-known method such as a method for correcting an output value from the position sensor 31 can be adopted. Thus, a detailed explanation thereof will be omitted.

Moreover, in the state where a guide for the user to release a finger from the button cover 224*b* is displayed in the main apparatus 20, the arm 323 is rotated in a direction in which the rotational angle θ is reduced so that the minimum value of an output from the position sensor 31 is adjusted to θ1, whereby an output value from the position sensor 31 also can be calibrated.

Similarly, in the state where a guide for the user to very strongly press the button cover 224*b* is displayed in the main apparatus 20, the arm 323 is rotated in a direction in which the rotational angle θ is reduced so that the minimum value of an output from the position sensor 31 is adjusted to θ2, whereby an output value from the position sensor 31 may be calibrated.

In addition, when the aforementioned calibration processes are combined, the maximum value and minimum value of the position sensor 31 can be calibrated.

[Interlocking with Belt]

Furthermore, in one example of the present embodiment, the arm member 323b may be interlocked with another mechanism within a range equal to or larger than the angle θ2 (or the range between θ2 and θ3) depicted in FIG. 5. For example, the mechanism may be a mechanism according to the belt part 23 which is a fixing tool of the operation device 10.

Figure 9:
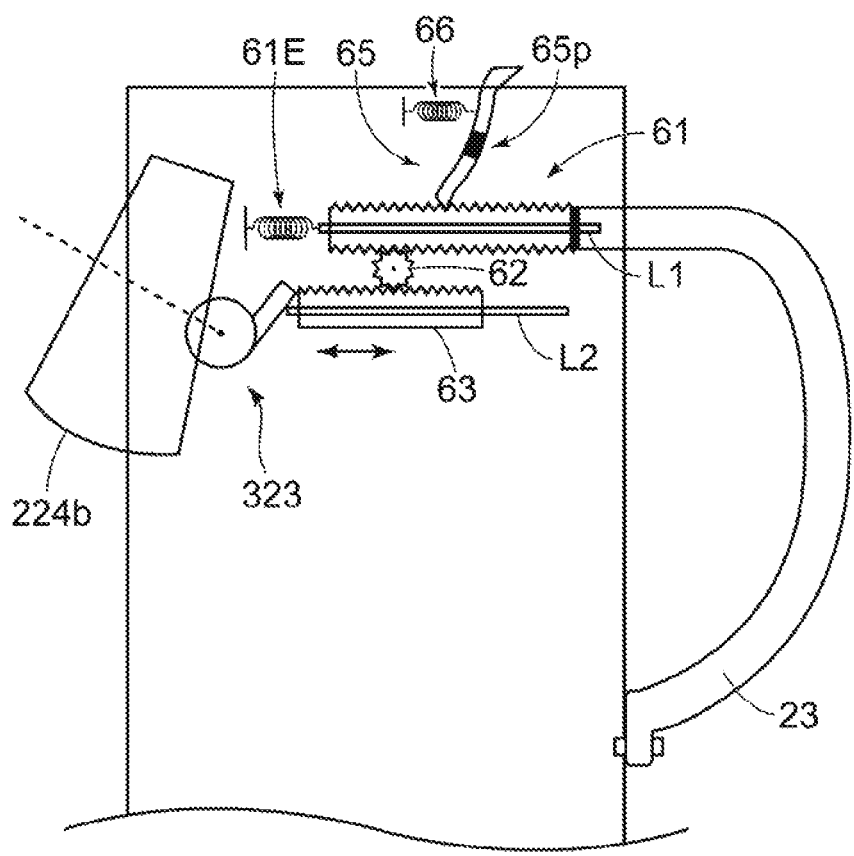
FIG. 9 is a schematic explanatory diagram depicting an example of a mechanism which is interlocked with the arm of the operation device according to the embodiment of the present invention.

Specifically, in this example, one end of the belt part 23 is fixed to a side surface of the main body of the operation device 10, and the other end is fixed to an end of a rack gear 61 which is supported in a movable manner along a predetermined guide rail L1 in the main body of the operation device 10, as depicted in FIG. 9. The other side end of the rack gear 61 is configured to be urged by an elastic body 61E such as a spring toward a direction in which the belt part 23 is discharged from the main body of the operation device 10. Further, a state where a pinion gear 62 is engaged with the rack gear 61, and further, a driving-side gear 63 which is another rack gear is engaged with the pinion gear 62, is established.

In addition, the surface opposite to the surface to be engaged with the pinion gear 62 of the rack gear 61 is cut to form teeth at a predetermined pitch. A ratchet 65 is engaged with the teeth. The ratchet 65 is supported at a fulcrum 65P in a rotatable manner about the fulcrum 65P. The lower end of the ratchet 65 has a claw having a shape to be engaged with the teeth of the rack gear 61. Moreover, the lower end side of the ratchet 65 relative to the fulcrum 65P is urged to a direction to be engaged with the rack gear 61, by the elastic body 66 such as a spring.

Accordingly, in a natural state (a state of not artificially being moved), the claw of the ratchet 65 is engaged with the teeth of the rack gear 61. Therefore, in the natural state, the rack gear 61 is movable only to a direction to draw an end of the belt part 23 into the operation device 10. On the other hand, the upper end side of the ratchet 65 is projected from the casing of the operation device 20. When the user operates the upper end side of the ratchet 65 (moves the upper end side to the right direction in FIG. 9) and rotates the ratchet 65 to a direction opposite to the urging direction of the elastic body 66, the claw of the ratchet 65 comes off the rack gear 61. As a result, due to the urging force of the elastic body 61E such as a spring, the end of the belt part 23 is pushed to the outside of the operation device 10.

In the present embodiment, one end of the driving-side gear 63 is pressed when the arm member 323b is within the range of at least the angle θ2 depicted in FIG. 5 (in this example, the range of at least θ2 but less than 180 degrees). That is, the driving-side gear 63 is also supported in a movable manner along the predetermined guide rail L2, and one end side of the driving-side gear 63 is disposed at a position so as to be pressed by the arm member 323b.

In this example, when the arm member 323b reaches the predetermined angle θk after exceeding the angle θ2 depicted in FIG. 5, the driving-side gear 63 is pressed to move the rack gear 61, via the pinion gear 62, to a direction to draw the end of the belt part 23 into the operation device 10. Then, when the arm 323 is not rotated any more by predetermined torque, the arm member 323b is returned into the range of the angle θ2 or smaller. Here, the end of the belt part 23 is in a state of being fixed at a position to which the end of the belt part 23 has been drawn by the ratchet 65.

Thus, the gain of the motor 321 that drives the arm 323 (and the position of the arm 323) are controlled, and the end of the belt part 23 is drawn into the operation device 10 (hereinafter, referred to as fastening operation), whereby the operation device 10 is more firmly fixed to the user's hand.

Thereafter, when the user artificially operates to move the claw of the ratchet 65 so as to cause the claw of the ratchet 65 to come off the ratchet gear, the end of the belt part 23 is pushed to the outside of the operation device 10 by the urging force of the elastic body such as a spring. Note that widely-known ones can be adopted as a mechanism and a member for performing, from the outside of the casing of the operation device 10, an operation of causing the claw of the ratchet 65 to come off the ratchet gear by interlocking with the claw of the ratchet 65. Thus, a detailed explanation thereof will be omitted.

In this example of the present embodiment, the main apparatus 20 side having detected that the user is gripping the operation device 10, performs the fastening operation. That is, the gain of the motor 321 that drives the arm 323 (and the position of the arm 323) are controlled. Accordingly, the end of the belt part 23 is drawn into the operation device 10, so that the operation device 10 can be more firmly fixed to the user's hand. Note that the arm member 323b does not move to an angle of 180 degrees or larger in this exemplified structure.

When this structure is used, the belt can be fastened with a fastening pressure that does not impose a burden on the user's hand, irrespective of the size of the user's hand, so that the operation device can be fixed to the user's hand.

Note that the degree of the belt fastening pressure may be set by the user himself/herself, in accordance with a parameter, etc., that can be set by a program being executed by the main apparatus 20. In this case, a designated value of a fastening pressure for each user may be held in association with user identification information (e.g., authentication information). Accordingly, when the main apparatus 20 recognizes that the operation device is mounted on the user on the basis of a sensor output from the operation device 10, user identification information inputted at a log-in time, or the like, the main apparatus 20 controls the motor that drives the arm 323 on the basis of the designated value of the belt fastening pressure held in association with the corresponding user identification information.

Note that, in the case where no parameter is set by the user himself/herself, or in the case where parameter setting by the user himself/herself is not performed, the main apparatus 20 performs, on the motor that drives the arm 323, preset control based on a prescribed belt fastening pressure value.

In still another example of the present embodiment, the belt fastening pressure may be controlled in accordance with a game program being executed by the main apparatus 20. Accordingly, belt fastening driving performed by the arm 323 can be used as a part of the game performance.

Further, the fastening operation may be performed when a predetermined situation in which fixation of the operation device to a hand can be unstable, such as a situation in which the user performs operation with a user's palm opened, is detected through a program at the main apparatus 20 side.

Note that the method for driving the belt in the fastening operation uses the arm 323, but the present embodiment is not limited to this method. For example, the fastening operation may be performed by driving the belt by means of a motor different from the motor that drives the arm 323, for example, and the operation device 20 may be fitted to the user in accordance with the size of the user's hand.

In addition, the aforementioned interlocking with the belt is one example, and thus, the arm member 323b may be interlocked with another mechanism.

REFERENCE SINGS LIST

10 Operation device, 11 Control section, 12 Storage section, 13 Interface section, 14 Communication section, 20 Main apparatus, 21 Grip part, 22 Operation part, 23 Belt part, 30 Button cover support section, 31 Position sensor, 32 Restriction section, 51 Reception section, 52 Haptic sense control section, 53 Output section, 61 Rack gear, 62 Pinion gear, 63 Driving-side gear, 65 Ratchet, 100 Circuit section, 210 Device body, 221 Sensor section, 222 Button operation section, 223 Finger sensor, 224 Locking button, 224b Button cover, 225 Catcher, 321 Motor, 322 Control circuit, 323 Arm, 323a Arm body, 323b Arm member

The invention claimed is:

1. An operation device comprising:
a movable member that is movable within a predetermined range; and
a restriction member that is disposed in a state of being movable in a movable direction of the movable member, that restricts a movable range of the movable member by coming into contact with a contact surface of the movable member in the movable direction, and that is switched between a state of being in contact with a first range of the contact surface and restricting the movable range of the movable member and a state of being in contact with a second range, the second range being different from the first range, of the contact surface and restricting the movable range of the movable member,
wherein either one of the first range and the second range of the contact surface of the movable member further includes a lock section that is locked with the restriction member, thereby interlocking movement of the restriction member with movement of the movable member.

2. The operation device according to claim 1, wherein the first range and the second range of the contact surface of the movable member are formed from raw materials having different Young's moduli.

3. An operation device comprising:
a movable member that is movable within a predetermined range; and
a restriction member that is disposed in a state of being movable in a movable direction of the movable member, that restricts a movable range of the movable member by coming into contact with a contact surface of the movable member in the movable direction, and that is movable between a state of being in contact with a first range of the contact surface and restricting the movable range of the movable member and a state of being in contact with a casing,
wherein the first range of the contact surface of the movable member further includes a lock section that is locked with the restriction member, thereby interlocking movement of the restriction member with movement of the movable member.

4. The operation device according to claim 3, wherein the first range of the contact surface of the movable member and a portion, of the casing, with which at least the restriction member comes into contact are formed from raw materials having different Young's moduli.

5. An operation device comprising:
a movable member that is movable within a predetermined range;
a restriction member that is disposed in a state of being movable in a movable direction of the movable member, that restricts a movable range of the movable member by coming into contact with a contact surface of the movable member in the movable direction, and that restricts the movable range of the movable member by coming into contact with a first range of the contact surface;
a belt-like member that has a pair of ends and that is wound around a user's hand; and
a mechanism that draws at least one of the ends of the belt-like member into a casing of the operation device and locks the end at a predetermined position, and that performs an operation of drawing the belt-like member into the casing in accordance with movement of the restriction member.

\* \* \* \* \*